United States Patent
Bakke

(10) Patent No.: US 11,188,806 B2
(45) Date of Patent: Nov. 30, 2021

(54) SYSTEM AND METHOD FOR SUPERVISING A PERSON

(71) Applicant: DIMEQ AS, Kalvåg (NO)

(72) Inventor: Ronny Bakke, Kalvåg (NO)

(73) Assignee: DIMEQ AS, Kalvåg (NO)

( * ) Notice: Subject to any disclaimer, the term of this patent is extended or adjusted under 35 U.S.C. 154(b) by 0 days.

(21) Appl. No.: 16/760,080

(22) PCT Filed: Nov. 17, 2017

(86) PCT No.: PCT/NO2017/050296
§ 371 (c)(1),
(2) Date: Apr. 29, 2020

(87) PCT Pub. No.: WO2019/098841
PCT Pub. Date: May 23, 2019

(65) Prior Publication Data
US 2020/0293851 A1    Sep. 17, 2020

(51) Int. Cl.
*G06K 19/077* (2006.01)
*H04W 4/029* (2018.01)
*H04W 4/90* (2018.01)
*H04W 4/80* (2018.01)
*G07C 9/22* (2020.01)
(Continued)

(52) U.S. Cl.
CPC ... *G06K 19/07762* (2013.01); *G06K 19/0717* (2013.01); *G06K 19/0723* (2013.01);
(Continued)

(58) Field of Classification Search
CPC ......... G06K 19/07762; G06K 19/0717; G06K 19/0723; G06K 7/10009; G06K 19/0718;
(Continued)

(56) References Cited

U.S. PATENT DOCUMENTS 9,430,888 B2 * 8/2016 Herrala ..................... G07C 9/28
9,552,569 B1 * 1/2017 Quan ..................... G06Q 10/087
(Continued)

FOREIGN PATENT DOCUMENTS

| CN | 205285290 U | 6/2016 |
| JP | 2001339754 A | 12/2001 |

(Continued)

OTHER PUBLICATIONS

Office Action Summary, Patent Application No. 2020-526266, Notice of Reasons for Refusal, Date of Drafting Aug. 30, 2021, Dispatch Date of Office Action, dated Sep. 7, 2021.

*Primary Examiner* — Seung H Lee
(74) *Attorney, Agent, or Firm* — Flener IP & Business Law; Zareefa B Flener

(57) ABSTRACT

This invention relates to system and a method for supervising a person in an area, the system comprising a mobile base (100), such as for example a wristband, attached to the person, the mobile base (100) comprising a first radio frequency tag (11) prepared for radio frequency triangulation or positioning for deciding a position of the mobile base (100) and for communicating health, safety and environment (HSE) related components, the system comprising a controller (400) in communication with the mobile base (100). Furthermore, the invention relates to a system and a method for activated communication between an object and a reader, comprising a first radio unit (11) attached to the object, the first radio unit being configured for communicating with the reader.

20 Claims, 2 Drawing Sheets

(51) Int. Cl.
  *G07C 9/28*  (2020.01)
  *G06K 19/07*  (2006.01)
  *H04W 4/02*  (2018.01)
(52) U.S. Cl.
  CPC ............... *G07C 9/22* (2020.01); *G07C 9/28* (2020.01); *H04W 4/023* (2013.01); *H04W 4/027* (2013.01); *H04W 4/029* (2018.02); *H04W 4/80* (2018.02); *H04W 4/90* (2018.02)
(58) Field of Classification Search
  CPC ......... H04W 4/029; H04W 4/90; H04W 4/80; H04W 4/023; H04W 4/027; G07C 9/22; G07C 9/28; G07C 1/10; G08B 21/023; G08B 21/04; G08B 21/0202; G08B 21/0275; G08B 21/0272; G01S 5/0221; G01S 5/0018; G01S 5/02
  See application file for complete search history.

(56) References Cited

U.S. PATENT DOCUMENTS

| | | | |
|---|---|---|---|
| 9,892,353 B1 * | 2/2018 | Lui | ............ H04W 4/02 |
| 10,769,924 B2 * | 9/2020 | H. Kazerouni | .... G08B 21/0269 |
| 2015/0084736 A1 | 3/2015 | Horton | |

FOREIGN PATENT DOCUMENTS

| | | | |
|---|---|---|---|
| JP | 2006060683 A | 3/2006 |
| JP | 2006135647 A | 5/2006 |
| JP | 2012113548 A | 6/2012 |

* cited by examiner

SYSTEM AND METHOD FOR SUPERVISING A PERSON

FIELD OF THE INVENTION

The present invention relates to a system and a method for monitoring a person in an area, the system comprising a mobile base, such as for example a wristband. The mobile base comprises a radio frequency tag prepared for radio frequency triangulation or positioning for deciding a position of the mobile base and for communicating health, safety and environment (HSE) related components. The system comprises a controller in communication with the mobile base. The present invention also relates to a system and a method for activated communication between an object and a reader comprising a first radio unit attached to the object, the first radio unit being configured for communicating with the reader.

BACKGROUND OF THE INVENTION

Health, Safety and Environment (HSE) has become a serious matter in working areas/spaces where human intervention is required. The personnel health and their habits during working hours and after hours, are some of the concerns that all industries face now a days. The bigger the company, the bigger the requirements of having some type of HSE system and standards in place for the employees.

The technology these days allows us to have much more information of our surroundings, letting us get more precise and accurate information relevant to our health and safety. The technologies available are not being applied as much as they should in working environments, and for improving the employee's security and health. Some working environments require restricted access, access control, and position control of personnel inside the working area. Such working environments can for example be onboard offshore platforms or vessels, or base stations on land. Certain areas inside the working space may be further restricted for access only to some people. In addition, it is often a desire or even a requirement, that a person inside such a working space is monitored in terms of working conditions such as temperature or surrounding hazardous gases, or for example in terms of the persons vital functions, such as heart rate.

WO2006085056 presents a muster apparatus for registering the arrival of a person at a position. A detector assembly detects the arrival of a person at one place and a controller communicates information of the arrival of the person to an operator.

WO2006046068 presents a tracking assembly that identifies an identity tag with an identification code being worn by a user at a position. A registering device is in signal communication with a controller and the controller presents to an operator when a user moves from one position to a second position. The presented position depends on the most recently registered position.

CN202842494 describes an intelligent safety helmet with functions of monitoring and personnel location. Active RFID terminal equipment is used to communicate wearing correctness, position, body temperature, and alarms.

Positioning systems using Bluetooth and Bluetooth Low Energy (BLE) are known in the art. E.g.: http://www.infsoft.com/blog/2015/indoor-navigation-and-indoor-positioning-using-bluetooth. Such applications typically use Bluetooth beacons to triangulate a mobile telephone within the range of the beacons and using an app in the telephone to calculate where the user of the telephone is, related to the known positions of the beacons.

WO2012129368 presents a system intended to locate, track, recognize and control objects. It consists of an active RFID tag attached to an object to be tracked, located, controlled, or recognized by a controller. When the user activates the controller, the controller transmits an inquiry to the tag, which then responds with an audible, visual or tactile signal so that the user can find the object. Location is determined by use of triangulation.

WO2014197623 presents a system, method and computer program for monitoring health and fitness of an individual. The individual is equipped with a radio frequency location tag and communicating with a computer to monitor a health, fitness or performance level of the individual based on information from a sensor, for example a pulse sensor.

Battery life is one of the challenges faced in all the previous and existing monitoring systems, especially those used for positioning personnel on areas or in units. Such monitoring systems usually use high frequency technology, due to its power, range and data transfer. However, using high frequency technology, battery consumption can be high and the period between each battery replacement or charge is short. There is also a risk for system downtime when battery runs out, and during battery replacement or charge. It is therefore a need for a monitoring system that can reduce the battery consumption and thereby reduce risk of system downtime and maintenance time and cost.

Another challenge is compatibility and installation in an existing working environment. The system must be possible to install, preferably without too much modification to the working environment, and the control system must be compatible with and/or adaptable to the working environment and its routines.

There is a need for a system that combines positioning, supervision of health, security and/or environment, and secure access control, especially in terms of supervision of persons in a working area. Combining these elements into one system gives advantages for example in an emergency situation, where an operator needs to know exactly who is present in an area, the exact location of personnel, and to be able to get information regarding the health of personnel. Thus, the present invention seeks to provide a system that overcomes the challenges and disadvantages described above. Furthermore, it seeks to provide an improved system and method for supervising an object or a person, by combining functions that enhances the security, quality and effectiveness of the system.

SUMMARY OF THE INVENTION

The present invention seeks to provide a system for monitoring persons in a designated area with improved security. It also seeks to reduce downtime and maintenance, and increase user friendliness of such a system. Further the invention seeks to provide a system that is low cost and easy to install. The invention also seeks to reduce the battery consumption of systems using radio frequency signals for communication. More specifically the invention seeks to reduce battery consumption of a mobile base used for supervision of an object, provide a 24 hour monitoring of personnel, and to provide multiple functions in combination, such as but not limited to positioning of personnel, monitoring health functions, access control, warning and/or alarm functions. It is also a goal to increase the security of the access control and monitoring functions.

The invention is based on utilizing standardized communication platforms and simple and light weight personal tags. By combining two types of radio frequency, for example high frequency (like BLE, WIFI, RFID) and low frequency (like VLF), a standby-modus can be implemented while maintain all functionality and the battery life of the components is extended substantially, using the same battery capacity as in known monitoring systems today.

The present invention provides improvements, is low cost, easy to install and can be used on any floating unit, building or any enclosed area/space. It can even be extended to more general use not restricted to the above, like open areas, public spaces etc. Furthermore, the invention is high tech, easy to wear and user friendly compared to many systems being available on the market today.

The objects of the invention are achieved by a system and a method for supervising a person in an area, as well as a system and a method for activated communication between an object and a reader.

Thus, in a first aspect, the system comprises a mobile base, such as for example a wristband, attached to the person to be supervised. The mobile base comprises a first radio frequency tag prepared for radio frequency triangulation or positioning for deciding a position of the mobile base, and hence the person wearing the mobile base, and for communicating health, safety and environment (HSE) related components. The system further comprises a controller in communication with the mobile base.

The mobile base also comprises a proximity based communication tag. Activation of the mobile base may be decided by a proximity based communication reader or scanner recognizing the proximity based communication tag on the mobile base, and communicating this to the controller, the controller being prepared to activate the monitoring system. This ensures that supervision of the person is only initiated when the person is inside the designated area for supervision. Furthermore, the system may comprise lock control by having a computer being prepared to unlock a lock. In this case, the computer has a fixed position of the lock prearranged in the computer. Proximity and identity verification of the mobile base to the lock may be decided with a proximity based communication reader in communication with and positioned proximate to the lock, and the reader can able to detect a proximity based communication tag on the mobile base being proximate to the reader and communicating this to the computer. The computer can be prepared to unlock the lock on this condition. The proximity based communication tag and reader may be NFC components for enhanced security in access control into the working area, or for access control to certain restricted access-areas within a working area. The proximity based communication reader may be prepared to read the proximity based tag at a distance smaller than 20 cm, providing an even more secure access control.

The first radio frequency tag may be a Bluetooth component which offers effective communication in terms of communication range and data transfer speed. In addition, the data package size, chip size and battery consumption are also beneficial in a mobile base as in this invention. Furthermore, Bluetooth offers a wide range of functions, especially in terms of integration with Internet of Things (IoT) and mobile devices, which can be utilized to provide a multifunctional system where the person to be supervised only wears a small wristband.

Preferably the tag is a Bluetooth Low Energy component for reduced battery consumption while maintaining the above mentioned advantages of a standard Bluetooth component. The mobile base may comprise a second radio frequency tag for activating the first radio frequency tag, and where the second tag is activated by entering a corresponding frequency field. The first and second radio tag may operate at different frequencies. The advantage of having the second tag is to provide a means for awakening and activating the first radio frequency tag only when relevant to have this tag activated. This way the power consumption of the mobile base can be significantly reduced, since the first tag does not need to send out signals regarding its position or data from sensors continuously. The second radio frequency tag may be a medium or low frequency (LF) tag, or preferably a very low frequency (VLF) tag. VLF is a proven technology for example in military underwater communication. The wavelength can travel from air to water, and water to air, and still be readable, which offers the possibility for this invention to detect signals in many different situations related to systems used in spaces on or close to water, for example rescue operations on vessels in water. In addition, the long range, low energy consumption and configurability make VLF technology especially suitable for this application. The VLF signals does not travel through steel walls, which is a functionality that can be used to control the range of a frequency field for example.

The system may further be prepared for receiving and collecting information from sensors related to health, safety, and/or environment (HSE), the sensors being integrated with the mobile base and detecting e.g. heart rate, temperature, acceleration or air toxicity. Furthermore, the system may comprise means for transmitting information from a server to a radio frequency receiver to e.g. a vibration motor or a display integrated with the mobile base. The person being supervised can then be provided with information, for example a warning of toxicity in the surrounding air or notifications regarding work, like shift change.

In a second aspect, the invention relates to a method for supervising a person whereby the system comprises the elements as disclosed above, and where the method comprises the steps of:
  a proximity based communication reader activating and registering the entrance to an area of a person wearing a mobile base by presenting the mobile base with a proximity based communication tag to the proximity based communication reader;
  the reader transmitting information regarding the entrance and activation from the reader to a controller:
  the controller initiating supervision of the person wearing the mobile base by radio frequency;
  the controller supervising the person wearing the mobile base by radio frequency;
  the user presenting the mobile base with the proximity based communication tag to the proximity based communication reader; and
  the controller terminating supervision of the person wearing the mobile base.

The method may also include the step of communicating additional information from HSE-related sensors to and from the mobile base. In one embodiment, the system also includes the step of using a second radio frequency tag to activate the first frequency tag during supervision period inside a designated area, after the proximity based communication activation has occurred. The second tag is then activated upon entrance to a frequency field operating at a frequency corresponding to the second tag.

In a third aspect, the invention relates to a system for activated communication between an object and a reader. The system comprises a first radio unit attached to the object, the first radio unit being configured for communicating with the reader. The system also comprises a second radio unit attached to the object, the second radio unit being adapted to be activated by a RF field. When the second radio unit is activated by the RF field, it activates the first radio unit. In this way, the first radio unit does not need to be active in terms of sending signals to the reader, unless the mobile base is in a RF-field, thus reducing the power consumption of the mobile base. The first and second radio units may operate at different frequencies. In one embodiment, the first radio unit may be a high frequency (HF) unit and the second radio unit may be a low frequency (LF) unit, preferably a very low frequency (VLF) unit. The radio frequency fields for activating the second radio unit may each have a limited range in a normal situation, for covering an entrance such as a door. The fields may be configured to be enlarged for special situations such as emergency situations, hence covering for example an entire room each, limited by steel walls making the room.

In a fourth aspect, the invention relates to a method for activated communication between an object and a reader, using the system as disclosed above in the previous aspect. The method comprises the steps of:

the second radio frequency unit being activated when the object with the unit enters a radio frequency field.

the second radio frequency unit activating the first radio frequency unit the first radio frequency unit being prepared for communication with a reader when activated.

The frequency range of the radio frequency bands referred to in throughout this document and including the claims, are defined as follows:

Very low frequency: 3 kHz to 30 kHz
Low frequency: 3 kHz to 300 kHz
High frequency: 3 Mhz to 30 GHz
Bluetooth/Bluetooth low energy (BLE): 2,4 GHz For the present invention, the mobile base 100 including its integrated components is regarded as a personal component to be kept under surveillance by the person, preferably by wearing it directly on the body of the person, at all times.

In the present document, Bluetooth and BLE (Bluetooth Low Energy) are used examples of communication systems that may be used in locating a unit within a vessel by using radio frequency triangulation but it is not intended to be limited to Bluetooth.

Likewise, NFC is used as an example of a secure way of short hold communication but it is not the intention to limit the invention to NFC for secure short hold communication.

Triangulating the mobile base 100 is in the present paper equivalent to triangulating the person carrying the mobile base 100.

DESCRIPTION OF THE DIAGRAMS

Embodiments of the present invention will now be described, by way of example only, with reference to the following diagrams wherein.

DESCRIPTION OF EMBODIMENTS OF THE INVENTION

Figure 1:
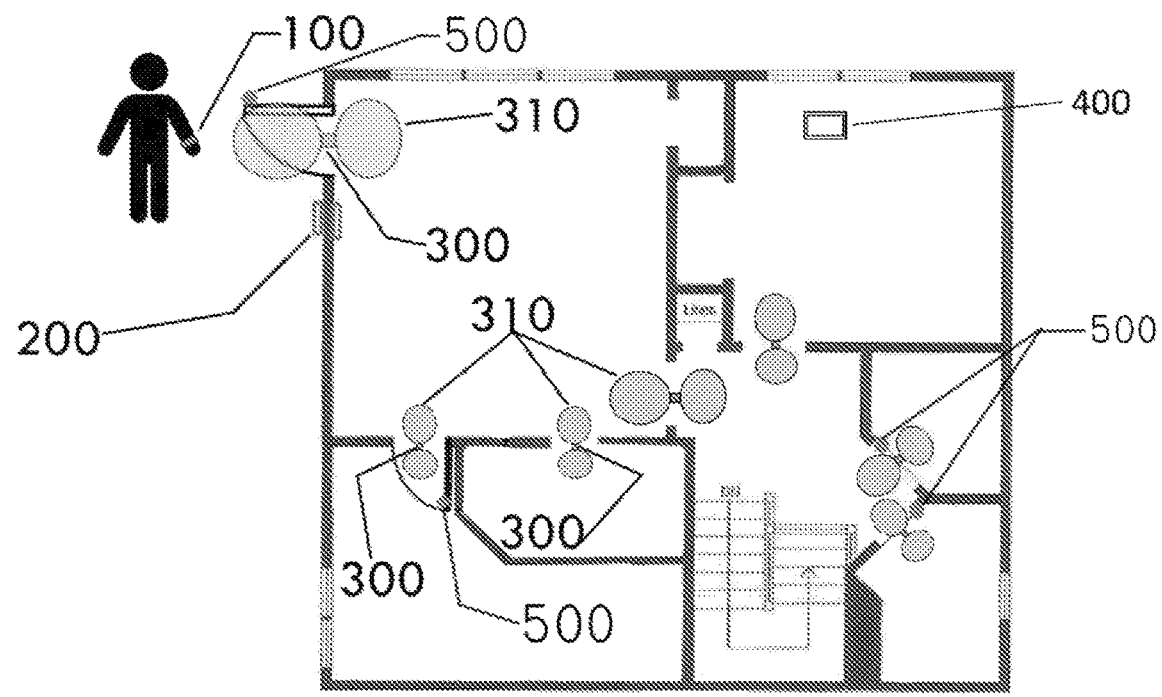
FIG. 1 shows a diagram of a system according to the present invention.

FIG. 1 shows a diagram of one embodiment of the invention, where the system is used for supervising a person in a working area. This person wears a mobile base 100 that is registered with this person. The mobile base 100 is a small, lightweight unit that is easy to attach to a person and it can be worn unattended. It is important that this mobile base 100 is fixed to the person to be monitored and not connected to clothing or equipment that is not permanently attached to the person.

The system further comprises a controller 400 for supervising the person wearing the mobile base. The mobile base 100 comprises a first radio frequency tag 11 (not shown in FIG. 1) that is prepared for being triangulated or positioned for deciding a position of the tag, which is worn by the user. The first radio frequency tag can preferably be a high frequency tag, such as a Bluetooth tag, to effectively be able to transmit data within the necessary range. Bluetooth Low Energy (BLE) may preferably be used, due to its reduced power consumption. In the further descriptions, the terms 'high frequency tag', 'Bluetooth tag' or 'BLE tag' all refers to the first radio frequency tag and it shall be understood that these are examples only of types of the radio frequency tag. The first radio frequency tag may also be used to communicate additional information, like information from sensors attached to the mobile base, or notifications to or from an operator. Such notifications can for example be, 'come to operation center' or 'stop working operation'. The purpose of the first frequency tag, is for the system to be able to triangulate its position, and to be able to communicate information from sensors to a controller via a reader. Hence, it is not essential for the system to function that the tag communicates with radio frequency. Other types of signals, like acoustic signals (for example ultrasound) or electromagnetic signals like infrared, could be used for the same purpose in this invention.

At least one gate or reader 300 is placed in a fixed position in an area, in order to communicate with the radio frequency tag on the mobile base 100. The number and positions of the gates depend on the actual implementation of the invention.

Figure 2:
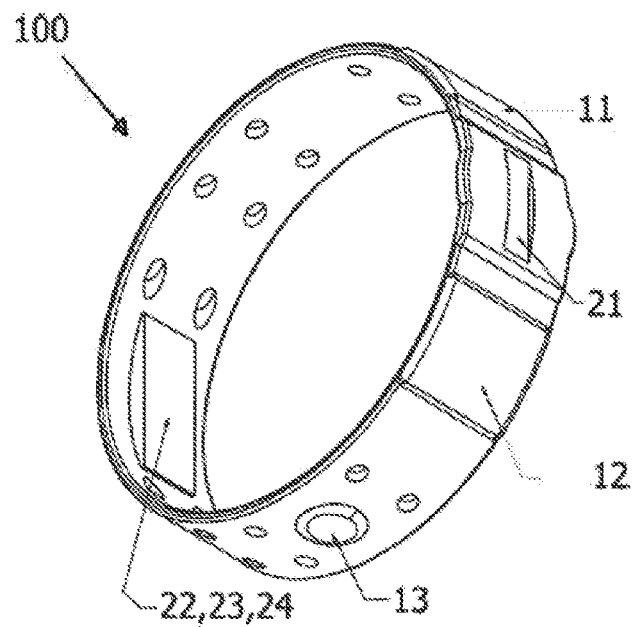
FIG. 2 shows an embodiment of the mobile base in the form of a wristband.

The mobile base 100 comprises as well a proximity based communication tag 13 (ref. FIG. 2.), such as a Near field communication (NFC) tag, that will activate the mobile base so the controller 400 can start the monitoring process. NFC technology enables enhanced security, and is known in the art for use in for example credit cards or smartphones for contactless payments. Security and confidential information is ensured by utilizing the short range of passive NFC communication. This range is typically less than about 10 or 15 cm.

The proximity based communication tag 13 does not need to use radio frequency for communication, and can for example be a bar code or a QR code to be scanned by an optical scanner. In the further descriptions of embodiments, NFC will be used as example for the proximity based communication components, and it shall be understood that the embodiments also comprise solutions using other proximity based communication technologies.

The activation process happens at the entrance of the unit /working area, where the NFC tag is registered by an NFC reader 200, and deactivation happens at the exit of the unit/working area. When this activation process happens, the radio frequency tag 11 will start working, when deactivating the NFC on the exit, the radio frequency tag will turn off.

The system further comprises a security feature where the user wearing the mobile base is detected as being proximate to a lock (500), and the computer being configured for unlocking the lock to allow only personnel with approved access to an area, for example access to enter the unit or working area, or even access to internal areas inside a working area with restricted access only to designated personnel. A computer comprises information that this particular person is allowed to unlock this lock, and issues a command for unlocking the lock, for example by wire or by radio. The proximity of the person to the lock 500 is detected by the controller 400 by triangulating the position and comparing to the position of the lock on a map of the working area, or by use of a proximity based communication tag, such as an NFC tag, in the mobile base being registered by a reader connected to or in proximity to the lock. By use of proximity based communication, the lock control is more secure, due to the requirement for proximity between the tag and the reader, for example less than 20 cm. An added feature with a wristband having an NFC tag 13, is to use this tag for payment. The tag is then linked to a bank account that the person has disposal of.

The mobile base may also comprises a second radio frequency tag 12 (ref. FIG. 2) embedded in the mobile base 100. The second tag 12 may operate at a different radio frequency than the first radio frequency tag (11), for example a low frequency tag. The low frequency tag may for example be of the type Very Low Frequency (VLF) tag, which is especially suitable for this application due to its long range, low energy consumption and configurability. In addition, the signals can travel from air to water, and water to air, but does not normally travel through for example steel walls.

The VLF tag will be activated when the person wearing the mobile base 100 with the VLF tag passes through the fields 310 created by gates/readers 300. The VLF tag will then activate the high frequency (BLE) tag 11 to pin point its position or triangulate the position. In this way the position and/or entry or exit of the mobile base 100 from any unit can be monitored. The time that the high frequency tag BLE stays activated is reduced, as it is only on when activated by the VLF tag upon passing or being in a field 310, and hence battery life of the mobile base 100 is extended. When exiting the VLF field, the BLE unit goes back to sleep mode.

Even on the event that the mobile base 100 does not get deactivated on its way out of the designated area for supervision by the NFC reader, the controller will be aware of it, but the mobile base will consume practically no battery as the high frequency tag (BLE tag) will only be turned on when the low frequency tag (VLF tag) gets activated by the fields from the gates/readers 300, and VLF only activates from these fields.

In the embodiment shown in FIG. 1, the low frequency fields are small, for example with a range of approximately 3 m, in order to cover for example a door. However, these fields can be increased, for example in an emergency situation, where an operator may want to activate all the BLE tags on all mobile bases inside an area. The VLF fields can then cover an entire vessel for example, depending on the layout of the readers, and the BLE tag on each mobile base of each person aboard will then be active and ping information for example every second.

FIG. 2 shows an embodiment of the mobile base 11, realized in the form of a wristband, which is convenient to carry. The mobile base comprises electronic circuits, and consumes very little power. Even if it is small, it preferably holds enough power to work continuously for 24 hours, one week or even a month or more without charging or replacing batteries. One or more radio frequency tags 11, 12 may be conveniently implemented in the wristband. In addition to a radio frequency tag used for triangulation 11, and a second radio frequency tag used for activating the first tag 12, the mobile base may comprise a proximity based communication tag, preferably an NFC-tag 13. For proximity based communication, it is especially convenient that the mobile base is in the form of a wristband, to easily present the tag in front of a reader. By utilizing passive tags with a short communication range, such as an NFC tag, security and confidential information can be ensured. In FIG. 2, the three tags are shown as separate units, however, units combining one or more RF chips may also be used for convenience.

The mobile base 100 can comprise sensors e.g. a temperature sensor 23, a bio electric sensor 22 e.g. a heart rate monitor, an accelerometer, a push button or a switch. These sensors may be related to HSE parameters, intended to ensure a good security, good health and a safe environment. The mobile base 100 can also comprise output units e.g. an indicator, an LCD display 21 or a vibration motor 24.

The sensors may be used for supervising various functions or parameters. For example, the temperature sensor may detect a body temperature being above or below normal body temperature of a healthy person indicating that this person is ill. If the body temperature below a normal body temperature, it may for example indicate that the wristband is no longer fastened correctly to a body, and the vibration motor may then inform the user and the mobile base may even summon a supervisor to solve the problem.

If the thermometer senses the temperature of the surrounding air, it may detect if the temperature is outside a recommended temperature range. The heart rate monitor may be used to detect if the person is calm or not and may also indicate health related issues. The accelerometer may be used to detect the person falling on the ground or falling overboard. The controller will be aware immediately and can triangulate the position of the person if still in range of the radio signals. The controller may also immediately log the GPS position of the vessel, to be used for rescue action.

The sensors and output units are in communication with the controller 400 via radio frequency, preferably the same as used for radio frequency triangulation. The controller 400 comprises a computer that may be prepared for giving alarms to different outputs e.g. wristbands, sirens, loudspeakers and transmitting alarms and for performing other functions such as unlocking a locked door. The alarms may be selective and on different levels alarming rescue personnel e.g. when a person has fallen off a vessel or medical personnel when a health issue is detected with the person. The person may also initiate a request for assistance by pushing a button on the wristband.

In a preferred embodiment, the invention is used as follows. A person is wearing a mobile base 100, in the form of a wristband. The wristband comprises a radio frequency tag 11 used for triangulation or positioning of the person wearing the wristband, in this embodiment the tag is a Bluetooth low energy unit. The wristband also comprises a radio frequency tag 12, used for activating the BLE tag 11. The wristband is designed to be worn by a person who is registered and to be worn all the time he is present in the area of supervision. The wristband further comprises an NFC tag 13. The person wearing the wristband enters a vessel, presents the wristband to an NFC reader 200. The NFC reader 200 detects the NFC tag 13, and sends a signal to a controller 400, which recognizes that this person is allowed entrance to the vessel, and which identifies this particular person from a list of registered people. The controller then activates supervision of this person through radio frequency. This activation feature is particularly advantageous in the sense that all people entering the vessel are identified with a high grade of security, due to the proximity required to register the wristband with the NFC tag 13. The system will know at all times how many people are on the vessel, and who are on the vessel. Only registered personnel will be allowed. Furthermore, an operator sends a notification via the controller to the person wearing the wristband 100 through radio frequency signals, communicating that the person is needed in another location, or that shift is over for example.

The Bluetooth low energy unit 11 is now in standby or sleep mode until the person moves into a low frequency field. The VLF unit recognizes this and wakes up the BLE unit which then pings its position to the readers. As long as this person is inside an LF field, the BLE unit will be in communication mode. The main purpose of this feature is to save energy by letting the BLE unit go into sleep mode.

An alarm goes of, indicating an emergency situation, and an operator wants to receive information regarding all personnel on the vessel. The low frequency fields are then increased to cover a large area or the entire area of the vessel, so that the BLE tags can ping their positions.

This function of waking up a transceiver from sleep mode is not only limited to applications such as supervising persons. The same function is relevant for all systems communicating information from an object to a reader by radio frequency signals and where it is not required that the RF unit transmitting the information is active at all times continuously transmitting information.

An added feature with a wristband 100 having an NFC tag 13 is to use this NFC tag 13 for payment. The NFC tag on the wrist of a person may then be linked to a bank account that the same person has disposal of. A person being supervised onboard the vessel may use the wristband to pay for articles bought in shops or when paying for a meal in an on board restaurant, not having to carry around an extra object like a wallet which can be stolen or lost. In a further embodiment, the NFC tag 13 may even be used to calibrate the tracking of a personal BLE unit 11 connected on the same mobile base 100.

A temperature sensor 23 sends a registered body temperature to the controller. A program in the controller detects if this temperature gets lower than e.g. 30 degrees centigrade, indicating that the wristband 100 is no longer correctly fastened to a body. An indicator e.g. a vibration motor 24 may then prompt the person or a supervisor is summoned to solve the problem.

An accelerometer communicates acceleration to the controller. A program in the controller detects if the person falls off the vessel. A GPS position of the vessel is registered immediately following this accident and actions are taken by rescue personnel. Said GPS position may be used as an indication of the position where the person fell off the vessel. In addition he still may be triangulated if the wristband 100 is within the range of the radio frequency triangulation.

An accelerometer communicates acceleration to the controller. A program in the controller detects if the person falls on the floor. If little movement is detected afterwards, a paramedic may be summoned. The person may initiate an alarm himself by pushing a push button on the wristband 100. By pushing another push button the person may withdraw an alarm himself.

The person intends to enter an area that he is allowed access to. He approaches a locked door, the system for supervising detects this and unlocks the lock 500 as the person is about to open the door. After passing, the door gets locked.

Higher security is achieved if a passive NFC tag 13 is used for recognizing the person who approaches the locked door. The tag, attached to the wristband 100, is then detected by an NFC reader 200 by the door and the reader communicates with the controller that then may accept access for the person through the door by unlocking the lock 500 of the door.

This person being supervised is undisturbed when not actively prompted. The wristband is designed to be worn around the clock during all normal human activities.

Figure 3:
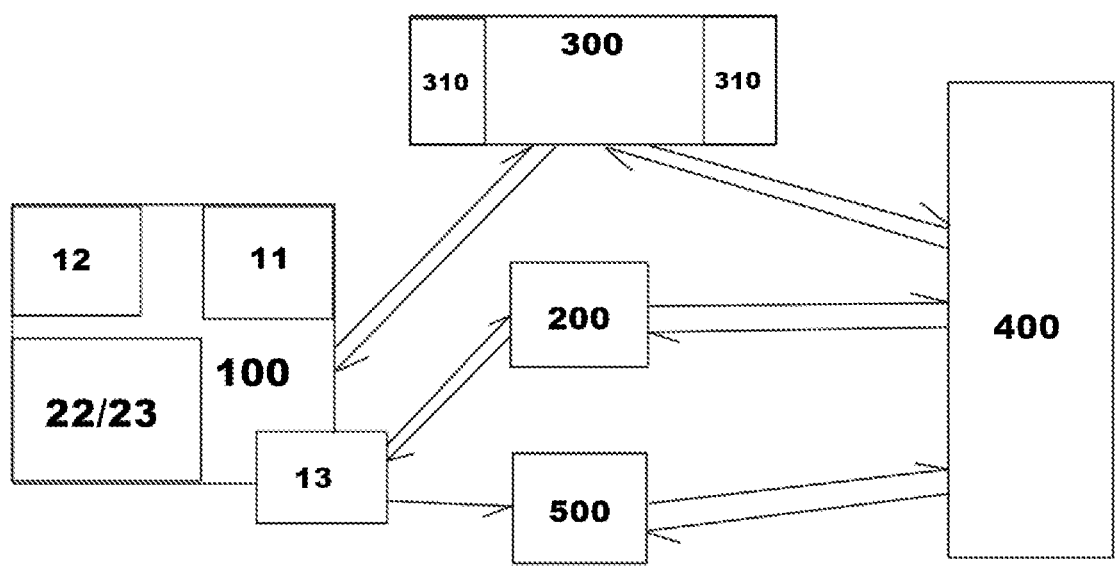
FIG. 3 shows a schematic of communication paths for the invention.

FIG. 3 shows a schematic of communication paths in a preferred embodiment of the invention. A mobile base 100, comprises three tags, a BLE tag 11, a VLF tag 12 and an NFC tag 13. The mobile base also comprises sensors 22,23. When the person wearing the mobile base 100 presents this to an NFC reader 200, the reader recognized this, and communicates the information to the controller 400, which can identify this person from a list of registered persons. The controller then communicates back to the NFC reader and the mobile base that supervision can be initiated. Supervision of the person wearing the mobile base initiates, the controller having information regarding the identity of the person and/or other information registered with this person. In access control, the mobile base 100 is presented in front of a lock, comprising means for detecting the identity of the mobile base, such as an NFC reader. The lock sends identity information to the controller, the controller 400 then verifies if this person is allowed access, and may issue a command back to the lock for unlocking the lock. During supervision period, there is a two-way communication between the mobile base and the radio transceivers/gates (300). The VLF tag gets activated from the LF field 310, and the BLE tag sends information to the radio transceivers 300. This information can be regarding position, data from sensors 22, 23, or other information like for example the person pushing a switch on the wristband 100, asking for help. Further, the transceivers 300 are in two-way communication with a controller 400, for forwarding information from the mobile base 100, and for receiving commands or notifications to send to the mobile base, This way a supervisor can issue messages, notifications, alarms etc. to one or more mobile bases via a controller for example in connection with a computer.

The figure illustrates the multifunctional aspects of this invention, and how the combination of the different tags and communication paths provides an improved system for supervising persons in an area. The system is an independent system that can continue working for example if power is out. All the necessary equipment can have their own power source, and with reduced battery consumption especially due to sleep-mode function on the mobile base, the risk of the mobile base shutting down is practically eliminated. This is highly advantageous in an emergency situation, especially on a vessel on water.

REFERENCE SIGNS

11 First radio frequency tag
12 Second radio frequency tag
13 Proximity based communication tag
21 Display
22 Bioelectric sensor
23 Temperature sensor
24 Vibrator
100 Mobile base
200 Proximity based communication reader
300 Radio Transceiver high and low frequency
310 Low frequency field
400 Controller
500 Lock

The invention claimed is:

1. System for supervising a person in an area, the system comprising a mobile base (100) configured to be attached to the person, the mobile base (100) comprising a first radio frequency tag (11) configured to perform radio frequency triangulation or positioning to determine a position of the mobile base (100) and to communicate health, safety and environment (HSE) related components, the system comprising a controller (400) in communication with the mobile base (100) characterized in that
the mobile base also comprises a proximity based communication tag (13), and the mobile base (100) is activatable by a proximity based communication reader or scanner (200) which is configured to detect the proximity based communication tag (13) on the mobile base (100) and communicate this detection to the controller (400), wherein the controller to is configured to activate the system and begin monitoring of the mobile base in response to the communication from the proximity based communication reader or scanner.

2. System according to claim 1, wherein the system comprises a lock control apparatus, the lock control apparatus comprising a computer configured to unlock a lock (500), wherein a fixed location of the lock (500) is stored in the computer; and a proximity based communication reader in communication with and positioned proximate to the lock (500); the reader being configured to detect the proximity based communication tag (13) on the mobile base when it is proximate to the reader, identify and verify the mobile base, and communicate the detection, identification, and verification to the computer, wherein the computer is configured to unlock the lock in response to the communication from the proximity based communication tag (13).

3. System according to claim 1, wherein the proximity based communication tag (13) and reader (200) are NFC components.

4. System according to claim 1, wherein the proximity based communication reader (200) is prepared to read the proximity based tag (13) at a distance smaller than 20 cm.

5. System according to claim 1, wherein the first radio frequency tag is a Bluetooth component.

6. System according to claim 1, wherein the first radio frequency tag is a Bluetooth Low Energy (BLE) component.

7. System according to claim 1, wherein the mobile base (100) comprises a second radio frequency tag for activating the first radio frequency tag, and where the second tag is activated by entering a corresponding frequency field (310).

8. System according to claim 7, wherein the second radio frequency tag is a low frequency (LF) tag, or preferably a very low frequency (VLF) tag.

9. System according to claim 1, wherein the system is configured to receive and collect information from sensors (22, 23) related to health, safety, and/or environment (HSE), the sensors being integrated with the mobile base (100).

10. System according to claim 1, wherein the system comprises means for transmitting information from a server to a radio frequency receiver integrated with the mobile base (100) intended to provide the person being supervised with information.

11. Method for supervising a person using the system as in claim 1, characterized in that the method comprises the steps of:
a proximity based communication reader (200) registering the entrance to an area of a person wearing a mobile base (100) when the person presents the mobile base with a proximity based communication tag (13) to the proximity based communication reader (200);
the reader (200) transmitting information regarding the entrance from the reader to a controller (400);
the controller (400) initiating supervision of the person wearing the mobile base (100) by radio frequency;
the controller (400) supervising the person wearing the mobile base (100) by radio frequency;
the user presenting the mobile base (100) with the proximity based communication tag (13) to the proximity based communication reader (200); and
the controller (400) terminating supervision of the person wearing the mobile base (100).

12. Method as in claim 11 also including the step of communicating additional information from HSE-related sensors (22, 23) to and from the mobile base (100).

13. Method as in claim 11 also including the steps of using a second radio frequency tag to activate the first frequency tag during supervision period inside a designated area, after the proximity based communication activation has occurred, wherein the second tag is activated upon entrance to a frequency field (310) operating at a frequency corresponding to the second tag.

14. A system for activated communication between an object and a reader,
comprising a first radio unit (11) attached to the object, the first radio unit being configured for communicating with the reader,
characterized in that the system further comprises a second radio unit (12) attached to the object,
wherein the second radio unit (12) is adapted to be activated by a RF field (310),
wherein the second radio unit (12) when activated by the RF field (310) activates the first radio unit (11).

15. The system according to claim 14, wherein the object also comprises a proximity-based communication tag.

16. The system according to claim 14, wherein the object is a wristband configured to be worn by a person.

17. The system according to claim 14, wherein the first radio unit (11) and the second radio unit (12) operates at different frequencies.

18. The system according to claim 17, wherein the first radio unit (11) is a high frequency (HF) unit and the second radio unit (12) is a low frequency (LF) unit, preferably a very low frequency (VLF) unit.

19. System according to claim 14, wherein the radio frequency fields (310) for activating the second radio unit (11) each have a limited range in a normal situation, for covering an entrance, and where the fields are configured to be enlarged in emergency situations, hence covering an entire room each.

20. Method for activated communication between an object and a reader, using the system as in claim 14, characterized in that the method comprises the steps of:
activating the second radio frequency tag when the object with the tag enters a radio frequency field (310).
activating the first radio frequency tag by the second radio frequency tag
initiating communication between the first radio frequency tag and a reader when the first radio frequency tag is activated.

* * * * *